(12) United States Patent
Weber et al.

(10) Patent No.: US 7,951,735 B2
(45) Date of Patent: May 31, 2011

(54) GLASS MATERIALS FOR OPTICAL GAIN MEDIA AND INFRARED OPTICS COMPRISING RARE EARTH OXIDE GLASS COMPOSITIONS

(75) Inventors: J.K. Richard Weber, Arlington Heights, IL (US); Jean Ann Tangeman, Evanston, IL (US); Daniel Scott Hampton, Mundelein, IL (US); Paul C. Nordine, Deerfield, IL (US)

(73) Assignee: 3M Innovative Properties Company, St. Paul, MN (US)

( * ) Notice: Subject to any disclaimer, the term of this patent is extended or adjusted under 35 U.S.C. 154(b) by 378 days.

(21) Appl. No.: 12/100,073

(22) Filed: Apr. 9, 2008

(65) Prior Publication Data

US 2009/0227440 A1  Sep. 10, 2009

Related U.S. Application Data

(63) Continuation of application No. 10/957,831, filed on Oct. 4, 2004, now abandoned.

(60) Provisional application No. 60/508,674, filed on Oct. 2, 2003.

(51) Int. Cl.
  *C03C 3/062* (2006.01)
  *C03C 3/095* (2006.01)
(52) U.S. Cl. .................. 501/73; 501/64; 252/301.4 R; 252/301.4 F; 372/40
(58) Field of Classification Search ............ 501/64, 501/73; 252/301.4 R, 301.4 F; 372/40
See application file for complete search history.

(56) References Cited

U.S. PATENT DOCUMENTS

| | | | |
|---|---|---|---|
| 2,805,166 A | 9/1957 | Löffler | |
| 4,088,023 A | 5/1978 | Berleue et al. | |
| 4,530,909 A | 7/1985 | Makishima et al. | |
| 4,608,352 A | 8/1986 | Laurent et al. | |
| 4,940,678 A | 7/1990 | Aitken | |
| 5,378,662 A | 1/1995 | Tsuyuki | |
| 5,553,088 A | 9/1996 | Brauch et al. | |
| 6,438,152 B2 | 8/2002 | Contag et al. | |
| 6,482,758 B1 | 11/2002 | Weber et al. | |
| 2005/0075233 A1 | 4/2005 | Weber et al. | |

OTHER PUBLICATIONS

Anscombe, "A New Spin: Thin-Disc Yb:YAG Lasers", Photonics Spectra, Solid-State Lasers, (Nov. 2002), pp. 54-60.
Fan, "Diode-Pumped Solid State Lasers", The Lincoln Laboratory Journal; (1990), pp. 413-425; vol. 3, No. 3.
Fornasiero et al., "New Oxide Crystals for Solid State Lasers", Cryst. Res. Technol., (1999), pp.255-260, vol. 34, No. 2.
Giesen et al., "Scalable Concept for Diode-Purfiped High-Power Solid-State Lasers", Applied Physics B, Lasers and Optics., (1994), pp. 365-372, vol. 58, Springer-Verlag.
Stewen et al., "A 1-kW CW Thin Disc Laser", IEEE Journal of Selected Topics in Quantum Electronics, (Jul./Aug. 2000), pp. 650-657, vol. 6, No. 4.
Weber et al., "Glass Formation and Polyamorphism in Rare-Earth Oxide-Aluminum Oxide Compositions", Journal of the American Ceramic Society, (Aug. 2000), pp. 1868-1872, vol. 83, No. 8.
Weber et al., "Laser Hearth Melt Processing of Ceramic Materials", Rev. Sci. Instrum. (Feb. 1996), pp. 522-524, vol. 67, No. 2, American Institute of Physics.

*Primary Examiner* — Karl E Group
*Assistant Examiner* — Elizabeth A Bolden
(74) *Attorney, Agent, or Firm* — Gregory D. Allen

(57) ABSTRACT

This invention relates to the use of novel glass materials comprising rare earth aluminate glasses (REA1™ glasses) in the gain medium of solid state laser devices that produce light at infrared wavelengths, typically in the range 1000 to 3000 nm and for infrared optics with transmission to approximately 5000 nm in thin sections. The novel glass materials provide stable hosts for trivalent ytterbium ($Yb^{3+}$) ions and other optically active species or combinations of optically active species that exhibit fluorescence and that can be optically excited by the application of light. The glass gain medium can be configured as a waveguide or placed in an external laser cavity, or otherwise arranged to achieve gain in the laser waveband and so produce laser action.

11 Claims, 8 Drawing Sheets

GLASS MATERIALS FOR OPTICAL GAIN MEDIA AND INFRARED OPTICS COMPRISING RARE EARTH OXIDE GLASS COMPOSITIONS

CROSS REFERENCE TO RELATED APPLICATIONS

This is a continuation of application Ser. No. 10/957,831, filed Oct. 4, 2004, abandoned, which claims priority to Application No. 60/508,674, filed Oct. 2, 2003, expired, the disclosure of which is incorporated by reference in their entirety herein.

STATEMENT REGARDING FEDERALLY SPONSORED RESEARCH OR DEVELOPMENT

This invention was made with government support under contract number DMI-0216324 awarded by the National Science Foundation and contract number F49620-02-C-0028 awarded by the Air Force Office of Scientific Research. The Government has certain rights in this invention.

FIELD OF INVENTION

This invention relates to solid state lasers that use novel glass compositions, comprising rare earth oxides and aluminum oxide (the REA1™ glasses) doped with optically active species, as the gain medium. It further relates to lasers based on these glass compositions that emit infrared light in the wavelength range from approximately 1000 to 3000 nm through the application of pump radiation at a wavelength of 970 nm to 990 nm, and preferably about 980 nm. It further relates to the use of REA1™ glasses that can be cast in the form of "blanks" that form components of laser gain media and windows, filters, or lenses that transmit infrared light.

BACKGROUND OF INVENTION AND DESCRIPTION OF THE PRIOR ART

The composition range of the REA1™ glasses is stated in U.S. Pat. No. 6,482,758, Nov. 19, 2002 incorporated herein by reference.

Glass materials are generally manufactured by starting with a liquid, formed by melting solid crystalline starting materials. The liquid is cooled in a way that prevents crystallization. While there are other ways to make glass, forming it from the liquid provides a simple way to achieve large pieces of material that can readily be formed into products. Here we show that by virtue of their optical, mechanical and thermal properties and the ability to fabricate the glasses by casting from a liquid, the REA1™ glasses provide a novel material for the gain medium used to construct infrared laser devices and for optical elements such as windows and lenses.

It should be noted that certain fabrication, coating, and other operations that are well-known in the art are typically employed to prepare components of devices from the glass optical materials and optical gain media of this invention.

Lasers that produce infrared light ("infrared lasers") are widely used in materials processing, optical communications, medical and dental diagnostics and surgical procedures, optical range finding and remote sensing, and numerous applications in analysis, marking, scribing, engraving and optical diagnostics. High power density lasers that provide a quality beam profile at infrared wavelengths are useful in materials processing operations including welding, metal cutting and metal forming operations, and medical procedures. Infrared lasers are also used in military applications for range finding, target designation, and missile guidance systems. Infrared lasers also have application in Homeland security, where sensors, laser-based detection, and laser-based defense systems that employ infrared lasers and laser technologies are being developed.

Many solid state lasers, for example the "neodymium:YAG" laser, employ trivalent rare earth ions distributed in a medium such as a crystal or a glass material that can be "pumped" to excite the laser active ions. Neodymium, erbium and ytterbium are widely used to generate light at infrared wavelengths. The gain medium provides a host for the laser active ions and forms a critical component of the laser. The gain medium must be able to transmit light at the laser wavelength with minimal losses. It may also provide a means to extract heat generated by the optical processes, and in some instances it provides a structural element of the laser itself. The gain medium may also be formed as the laser cavity by placing reflective coatings on various surfaces. Solid state lasers that employ a REA1™ glass doped with optically active species are within the scope of this invention.

The advent of high power density lasers based on Yb-doped Yttrium Aluminum Garnet (YAG) crystals containing several percent ytterbium has shown the utility of Yb lasers that can be pumped over a narrow wavelength range by using commercially available infrared laser diodes. Ytterbium ions are a desirable dopant for laser applications because, unlike other optically active rare earth ions, electronically excited Yb ions do not suffer from energy-sapping cross relaxation and excited-state absorption processes. Pumping the strongly absorbing $^2F_{7/2}$ state in trivalent Yb ions with laser diodes overcomes the limitation of low pump absorption with the broadband lamp pumping schemes commonly used in Nd-based lasers. The close spacing of the absorption and emission bands in $Yb^{3+}$ results in small conversion losses.

While the Yb lasers were first demonstrated as flashlamp-pumped devices in 1965, it is only recently that these lasers have acquired technological significance, through advances in pump sources, laser gain media, and laser output power that can be achieved. Small, diode-pumped Yb-doped rod lasers were first demonstrated at the Lincoln Laboratory around 1990. Subsequent laser development at Lawrence Livermore National Laboratory, Raytheon and other laboratories in the US and abroad has increased the power output of small (~5 mm diameter, 10 mm length) rod lasers towards 1 kW to provide an enormous specific power. The thin disk Yb:YAG laser was pioneered in Germany. Power output of ~650 Watts has been demonstrated in 0.2 mm thickness disks pumped in a region a few millimeters in diameter. The disk laser is predicted to enable a power output of ca. 10 kW from a single small disk laser device. By providing a larger planar surface for heat extraction than is possible in a long cylinder, the disk laser has potential to achieve the maximum possible power density. The wide availability of inexpensive and electrically efficient InGaAs-based laser diodes which operate in the 940-980 nm pump wavelength range needed to realize Yb-based lasers has laid the foundation for new near IR power laser products. Optical efficiencies of around 50% are achieved in disk laser configurations operating near room temperature; even higher efficiencies have been obtained using cryogenically cooled disks.

The present invention provides novel glass host materials for the Yb ions, i.e., the "REA1™" glasses comprised of rare earth oxides and aluminum oxide, that are used to make Yb:REA1™ glass laser devices. Technical drawbacks of crystalline Yb:YAG lasers relative to the lasers of the present invention are: (i) the $Yb^{3+}$ absorption band typically necessitates pumping at around 940 nm, rather than 980 nm where inexpensive and powerful diode laser pump sources are available, (ii) pumping at 940 nm rather than 980 nm, in combination with laser emission at a wavelength of ~1030 nm, leads to increased heat generation which limits the total power density that can be achieved, (iii) the smaller magnitude of the ground state absorption in Yb:YAG, reduces the efficiency of pump power utilization, and (iv) strain-induced birefringence in melt grown crystals due to growth stresses and lattice strain can produce beam deflection and instability in the laser cavity.

Lasers and devices that transmit infrared radiation that are based on REA1™ glasses also have potential cost advantages over the YAG- and other crystalline host-based devices because the glass forming operations are relatively inexpensive compared with crystal growing operations.

The use of REA1™ glasses for windows, lenses, filters, and other optical applications that require infrared transmitting material benefits from (i) the large Abbe number, (ii) the range of Abbe numbers, and (iii) the IR transmission to wavelengths of ~5000 nm, and (iv) the large refractive index of these materials. The REA1™ glasses provide superior values of these properties relative to the familiar silicate glasses. The REA1™ glasses also provide thermal, chemical, and environmental stability that is superior to other infrared transmitting materials such as fluoride and tellurite glasses.

SUMMARY OF THE INVENTION

The invention is an optical gain medium comprising a bulk single phase glass. The bulk single phase glass comprises 27 to 50 molar % $RE_2O_3$ and 50 to 73 molar % $Al_2O_3$, where RE is one or more elements selected from the group consisting of Sc, Y, La, Ce, Pr, Nd, Pm, Sm, Eu, Gd, Tb, Dy, Ho, Er, Tm, Yb and Lu. The optical gain medium may be used in a manner such that gain is generated by application of light in the wavelength range from 970-990 nm. The optical gain medium may be doped with ytterbium ions or other dopant ions such as Er, Tm or Ho. Gain may be generated by electronic transitions of Yb or other dopant ions such as Er, Tm or Ho.

In a second aspect of the invention, the invention is an optical gain medium consisting essentially of a bulk single phase glass comprising one or more rare earth oxides, aluminum oxide and silicon dioxide wherein the composition of the bulk single phase glass lies substantially within the heptagonal region of the ternary composition diagram of the rare earth oxide-alumina-silica system defined by points having the following molar percent compositions: 1% $RE_2O_3$, 59% $Al_2O_3$ and 40% $SiO_2$; 1% $RE_2O_3$, 71% $Al_2O_3$ and 28% $SiO_2$; 23% $RE_2O_3$ and 77% $Al_2O_3$; 50% $RE_2O_3$ and 50% $Al_2O_3$; 50% $RE_2O_3$ and 50% $SiO_2$; 33.33% $RE_2O_3$, 33.33% $Al_2O_3$ and 33.33% $SiO_2$; and 16.67% $RE_2O_3$, 50% $Al_2O_3$ and 33.33% $SiO_2$. The optical gain medium may be used in a manner such that gain is generated by application of light in the wavelength range from 970-990 nm. The optical gain medium may be doped with ytterbium ions or other ions such as Er, Tm or Ho. Gain may be generated by electronic transitions of Yb, Er, Tm of Ho.

In a third aspect of the invention, the invention is an optical material consisting essentially of a bulk single phase glass comprising 27 to 50 molar % $RE_2O_3$ and 50 to 73 molar % $Al_2O_3$, where RE is one or more elements selected from the group consisting of Sc, Y, La, Ce, Pr, Nd, Pm, Sm, Eu, Gd, Tb, Dy, Ho, Er, Tm, Yb and Lu and wherein the glass is formed by casting of a molten material.

In a fourth aspect of the invention, the invention is an optical material consisting essentially of a bulk single phase glass comprising one or more rare earth oxides, aluminum oxide and silicon dioxide wherein the composition lies substantially within the heptagonal region of the ternary composition diagram of the rare earth oxide-alumina-silica system defined by points having the following molar percent compositions: 1% $RE_2O_3$, 59% $Al_2O_3$ and 40% $SiO_2$; 1% $RE_2O_3$, 71% $Al_2O_3$ and 28% $SiO_2$; 23% $RE_2O_3$ and 77% $Al_2O_3$; 50% $RE_2O_3$ and 50% $Al_2O_3$; 50% $RE_2O_3$ and 50% $SiO_2$; 33.33% $RE_2O_3$, 33.33% $Al_2O_3$ and 33.33% $SiO_2$; and 16.67% $RE_2O_3$, 50% $Al_2O_3$ and 33.33% $SiO_2$, where RE is one or more elements selected from the group consisting of Sc, Y, La, Ce, Pr, Nd, Pm, Sm, Eu, Gd, Tb, Dy, Ho, Er, Tm, Yb and Lu and wherein the glass is formed by casting of a molten material.

DETAILED DESCRIPTION OF INVENTION

Figure 1:
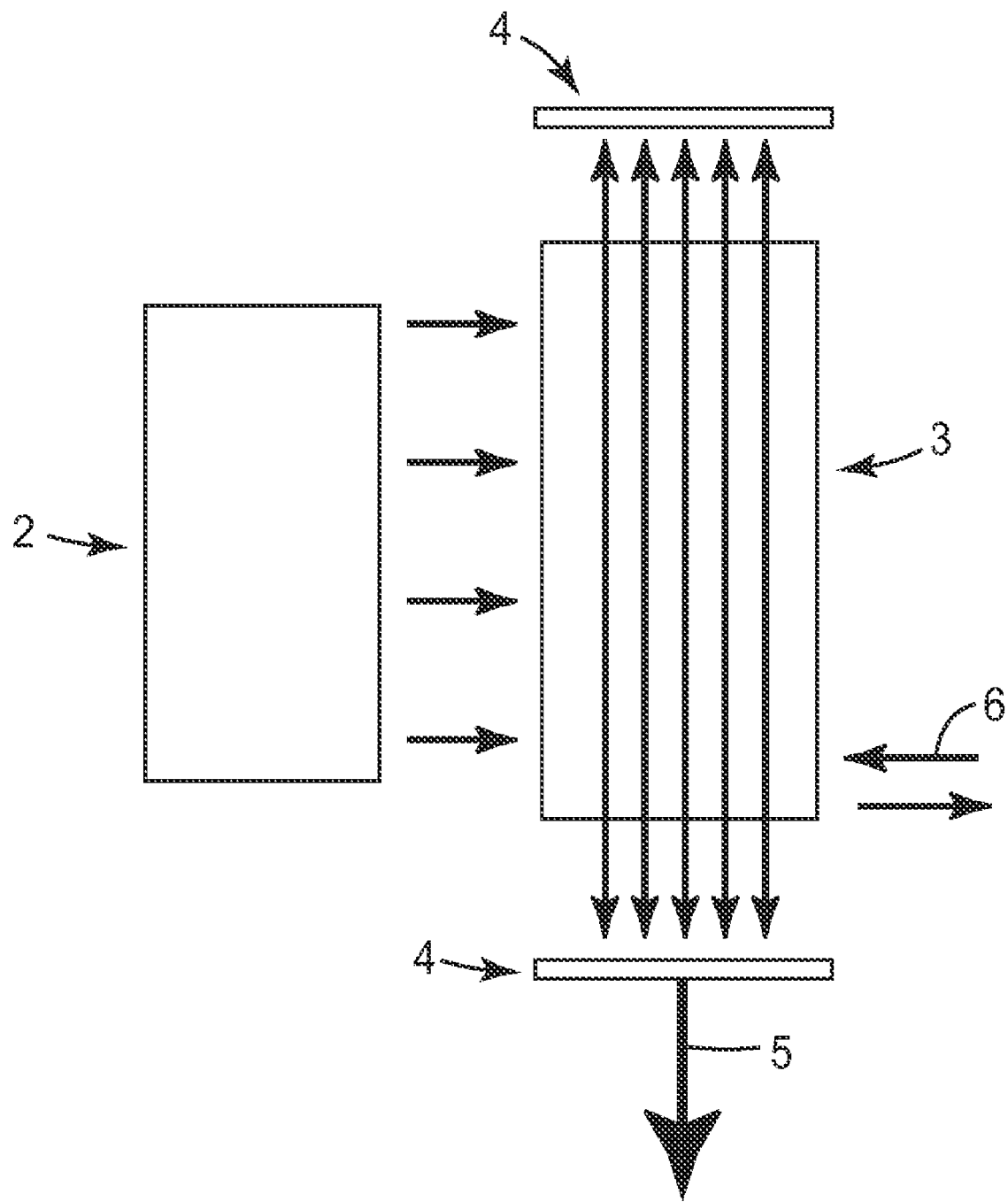
FIG. 1 is a schematic diagram illustrating the use of REA1™ glass as gain medium in a solid state laser.

This invention relates to the use of the REA1™ glass materials doped with up to 20 mole % $Yb_2O_3$ as the gain medium in solid state infrared lasers. The invention further relates to REA1™ glass gain media containing additional optically active rare earth ions that may be optically excited by energy transfer from excited ytterbium ions, e.g. $Er^{3+}$, $Tm^{3+}$, $Ho^{3+}$, and combinations thereof. By combing ytterbium and the additional optically active ions, the high efficiency of pump absorption at 980 nm by $Yb^{3+}$ can be exploited to provide a reservoir of energy to excite the additional dopants by energy transfer from the excited ytterbium ions.

The REA1™ glass materials are based on rare earth oxide and aluminum oxide, and may comprise up to 30 mole % of $SiO_2$. In this disclosure, we show that these glasses have properties favorable to operation of novel laser devices and that they maintain these properties at the high dopant concentrations that are possible in the REA1™ glass family of materials. The glass materials have a wide homogeneity range so that the dopant concentrations are not restricted by stoichiometric considerations that may limit the concentrations of dopants in crystalline hosts. Further, unlike glass materials, high dopant concentrations tend to produce birefringence and strain in crystalline materials. The glasses can be cast into a variety of forms by melting starting materials in a platinum crucible. Some of the compositions have melting temperatures that exceed the approximately 1950K upper temperature limit for processing in platinum crucible. These higher-melting compositions may be cast into glass after melting in an iridium crucible. While casting is known in the art of glass making, its application in REA1™ glass synthesis is novel. Prior art syntheses of REA1™ glasses have employed high cooling rates to form the glasses. The prior art cooling rates exceed those achieved in the casting operations, and it has not been previously demonstrated that synthesis of bulk REA1™ glasses by casting operations used in the present invention is possible. Previously, the REA1™ glasses were synthesized using levitation melting techniques that avoided nucleation of crystals in the liquid. The new glasses can be cast to form rods, plates and a wide variety of shapes. These products may be finished if necessary, by polishing, machining, or other conventional operations, to form the laser gain block components, windows, and optical components such as lenses or filters that exploit absorption bands of optically active dopant ions. Tables I and II present compositions of REA1™ glasses that can be formed by casting from platinum or iridium crucibles.

TABLE I

Examples of glass compositions. Balance is $Al_2O_3$ in all cases.

Chemical Composition, Mole Percent

| Example | $Y_2O_3$ | $La_2O_3$ | Other Oxides | | | | |
|---|---|---|---|---|---|---|---|
| I-A | 10 | 20 | | | | | 20 $SiO_2$ |
| I-B | 25 | | | | | | 30 $SiO_2$ |
| I-C | 20 | | | | | | 30 $SiO_2$ |
| I-D | 20 | | | | | | 25 $SiO_2$ |
| I-E | 10 | 15 | | | | | 25 $SiO_2$ |
| I-F | 10 | 10 | | | | | 30 $SiO_2$ |
| I-G | 7.5 | 15 | 2.5 $Gd_2O_3$ | | | | 20 $SiO_2$ |
| I-H | 9 | 15 | 1 $Gd_2O_3$ | | | | 10 $SiO_2$ |
| I-I | 7.5 | 15 | 2.5 $Gd_2O_3$ | | | | 15 $SiO_2$ |
| I-J | 7.5 | 15 | 2.5 $Gd_2O_3$ | | | | 20 $SiO_2$ |
| I-K | 7.5 | 15 | 2.5 $Gd_2O_3$ | | | | 15 $SiO_2$ |
| I-L | 5 | 15 | 2 $Gd_2O_3$ | 2 $ZrO_2$ | | | 10 $SiO_2$ |
| | | | 2 $Sc_2O_3$ | 2 $HfO_2$ | | | |
| | | | 2 $Lu_2O_3$ | | | | |
| I-M | 7 | 13.5 | 2 $Gd_2O_3$ | | | | 22.5 $SiO_2$ |
| I-N | 7.5 | 12 | 0.5 $Gd_2O_3$ | | | | 15 $SiO_2$ |
| I-O | 7.5 | 15 | 2.5 $Gd_2O_3$ | | | | 18 $SiO_2$ |
| I-P | 5.8 | 6.5 | | 14.8 $ZrO_2$ | | | 21.1 $SiO_2$ |

TABLE II

Examples of glass compositions that contain optically active dopants. Balance is $Al_2O_3$ in all cases.

Chemical Composition, Mole Percent

| Example | $Y_2O_3$ | $La_2O_3$ | Other Oxides | | | |
|---|---|---|---|---|---|---|
| II-A | 14.6 | | | | 0.4 $Er_2O_3$ | 30 $SiO_2$ |
| II-B | 19 | | | | 1 $Er_2O_3$ | 25 $SiO_2$ |
| II-C | 5 | 15 | | | 5 $Er_2O_3$ | 20 $SiO_2$ |
| II-D | 5 | 15 | | | 5 $Nd_2O_3$ | 20 $SiO_2$ |
| II-E | 7.5 | 10 | 2.5 $Gd_2O_3$ | | 5 $Nd_2O_3$ | 20 $SiO_2$ |
| II-F | 5 | 15 | 2 $Gd_2O_3$ | | 2 $Er_2O_3$ | 10 $SiO_2$ |
| | | | 2 $ZrO_2$ | | 2 $Ho_2O_3$ | |
| | | | 2 $HfO_2$ | | | |
| II-G | 5.5 | 15 | 2.5 $Gd_2O_3$ | | 2 $Yb_2O_3$ | 20 $SiO_2$ |
| II-H | 7 | 15 | 2 $Gd_2O_3$ | | 2 $Yb_2O_3$ | 20 $SiO_2$ |
| | | | 2 $ZrO_2$ | | | |
| | | | 2 $HfO_2$ | | | |
| II-I | 4.5 | 15 | 2.5 $Gd_2O_3$ | | 3 $Yb_2O_3$ | 20 $SiO_2$ |
| II-J | 3.5 | 15 | 2.5 $Gd_2O_3$ | | 4 $Yb_2O_3$ | 20 $SiO_2$ |
| II-K | 9 | 18 | | | 3 $Yb_2O_3$ | 15 $SiO_2$ |
| II-L | 7 | 15 | | | 3 $Yb_2O_3$ | 20 $SiO_2$ |
| II-M | 7 | 15 | 2 $Gd_2O_3$ | | 5 $Yb_2O_3$ | 15 $SiO_2$ |
| | | | | | 1 $Er_2O_3$ | |
| II-N | 7 | 17 | 2 $Gd_2O_3$ | | 3 $Yb_2O_3$ | 15 $SiO_2$ |
| | | | | | 1 $Er_2O_3$ | |
| II-O | 7.5 | 15 | 2.5 $Gd_2O_3$ | | 3 $Er_2O_3$ | 20 $SiO_2$ |
| | | | | | 1 $Tm_2O_3$ | |
| II-P | 7.5 | 15 | 2.5 $Gd_2O_3$ | | 3 $Er_2O_3$ | 20 $SiO_2$ |
| | | | | | 1 $Ho_2O_3$ | |
| II-Q | 7.5 | 15 | 2.5 $Gd_2O_3$ | | 3 $Er_2O_3$ | 20 $SiO_2$ |
| | | | | | 1 $Dy_2O_3$ | |

When they are doped with ytterbium the glasses provide a high ground state absorption cross section for $Yb^{3+}$ ions that is approximately 2.5 times larger than for crystalline YAG. The Yb-dopant is added in this instance via ytterbium oxide $Yb_2O_3$. The Yb may be added by use of potentially any source or combination of sources of trivalent ytterbium such as a carbonate, oxalate, oxide, or other forms.

Figure 2:
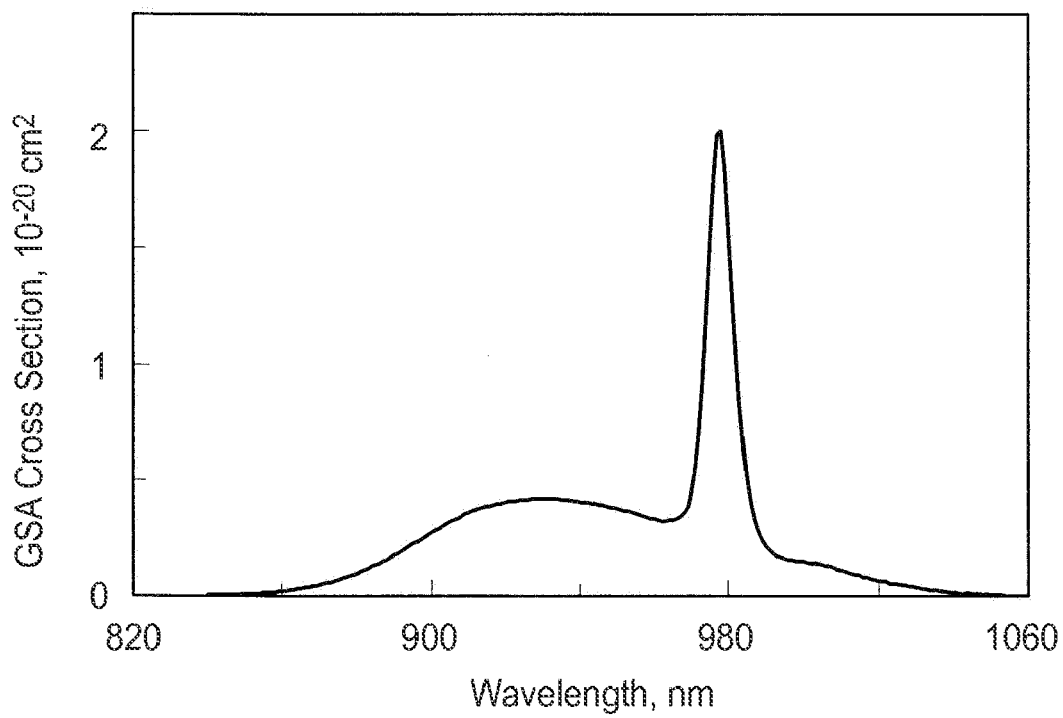
FIG. 2 illustrates the absorption cross section spectrum of a REA1™ glass containing $Yb^{3+}$ ions.
Figure 3:
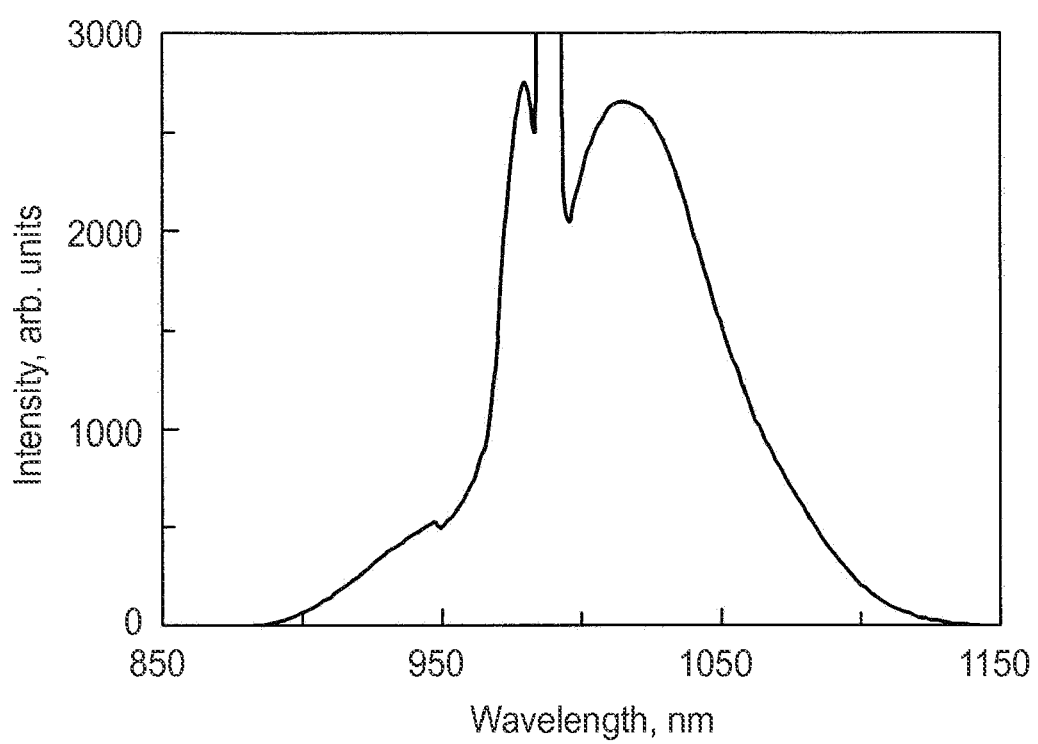
FIG. 3 shows the emission spectrum of a REA1™ glass doped with $Yb^{3+}$ ions and excited by a 980 nm diode pump laser.

The ground state absorption cross section of ytterbium ions is shown as a function of wavelength for a Yb-doped REA1™ glass in FIG. 2. The peak absorption is closely matched to the 980 nm laser diode wavelength which enables the use of inexpensive diode lasers for pumping. The fluorescence emission spectrum of the ytterbium ions is shown in FIG. 3. In this figure, the off-scale peak at ~980 nm is due to diode laser pump light used to excite the fluorescence. The small separation in wavelength between the pump and the Yb laser emission, which typically occurs at ~1030 nm, means that the Yb:REA1™ glass laser can be more efficient than the Yb:YAG crystal devices. In particular, use of the longer wavelength 980 nm pump radiation in Yb:REA1™ glass will reduce heat generation in the gain medium. Heat in the gain medium results in changes in density and optical properties, wavefront distortion and ultimately limits the power that can be extracted from a device. The use of the new glass materials of this invention provides the basis for more-efficient lasers that employ gain media formed by glass casting operations that are inexpensive compared with the crystal growth operations required to make Yb:YAG lasers.

As shown in U.S. Pat. No. 6,438,152, glasses have been made with up to 20 mole % $Yb_2O_3$ and with mixtures of $Yb_2O_3$ and other optically active dopants such as $Er_2O_3$. As described in the prior art, these glasses provide a high solubility of all the rare earths. A wide range of rare earth dopant compositions can be used, thus energy transfer processes between different rare earth ions can be exploited as a means to obtain high pump utilization efficiency. In addition, codoping with Yb and other rare earth ions enables the use of 980 nm laser diodes to excite laser action from species that do not absorb the 980 nm pump radiation.

Figure 4:
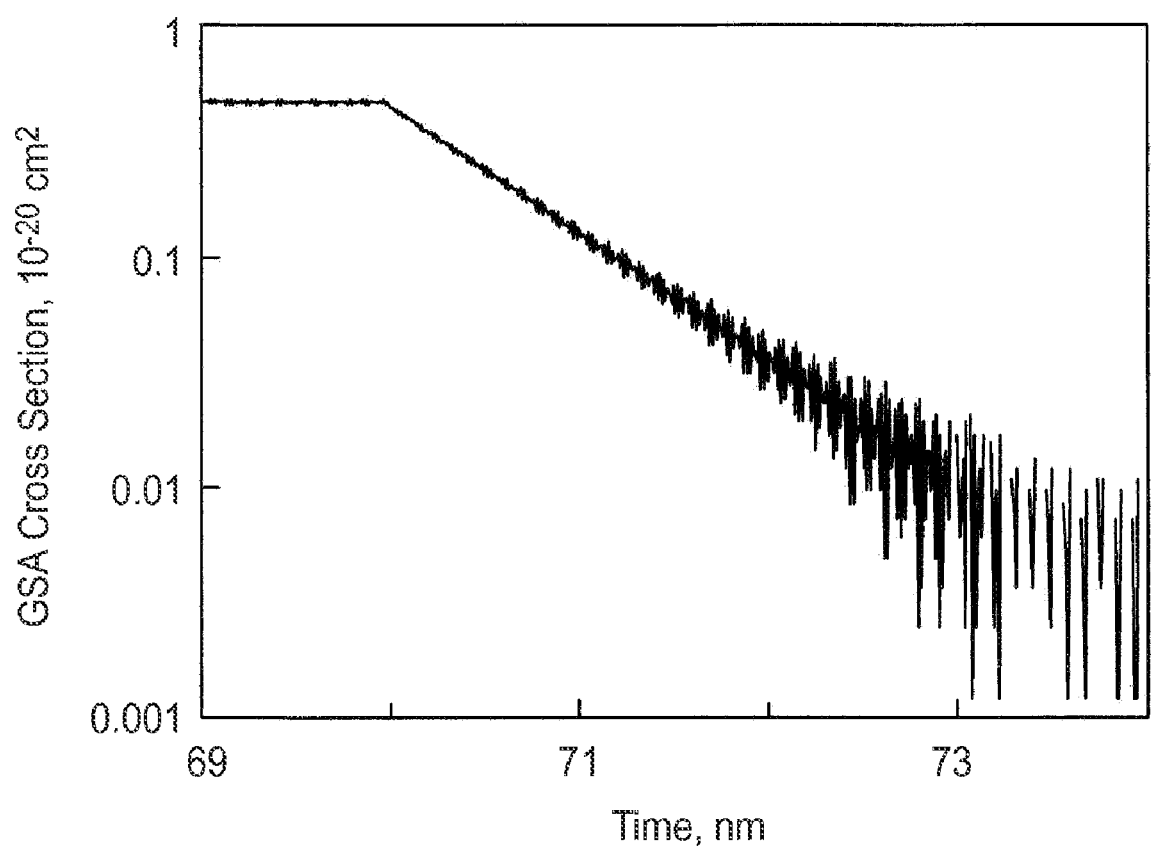
FIG. 4 shows the fluorescence decay curve observed in a REA1™ glass doped with $Yb^{3+}$ ions, giving a fluorescence lifetime of $Yb^{3+}$ ions of approximately 800 microseconds.

A further property of ytterbium ions in the REA1™ glass that makes it useful in laser devices is the fluorescence lifetime of excited $Yb^{3+}$ ions. A measurement of the fluorescence lifetime of excited $Yb^{3+}$ ions in REA1™ glass is shown in FIG. 4. A plot of the fluorescence lifetime of excited Yb ions in REA1™ glasses is shown as a function of Yb concentration in FIG. 5. The lifetime is comparable to the $Yb^{3+}$ fluorescence lifetime in other hosts, i.e., 0.5 to 1 ms.

In addition to the advantageous spectroscopic properties of Yb-doped REA1™ glass, the materials can be formed using relatively low cost processes compared to those required to fabricate single crystal materials. The glasses can be cast in various forms by pouring molten material into molds. The molds can be maintained at an elevated temperature and allowed to cool slowly after the glass is formed to relieve stress in the as-formed glass. The glass may also be cast into a mold that is initially at room temperature. The glasses can be annealed at temperatures up to ~1100K to relieve stresses. The addition of rare earth ions does not result in lattice strains in the amorphous hosts. The glasses are homogeneous. The use of Yb-doped REA1™ glass thus enables lasers with the following properties:

High optical conversion efficiency
High laser power output
Minimal operating temperature at given laser power output
Wide range of compositions not restricted by crystal stoichiometry
Easy fabrication of the gain medium
Optically isotropic gain medium
Efficient absorption of pump radiation
Robust and compact devices Table III presents properties of the REA1™ glass materials that have been measured on samples of materials formed either by levitation melting and cooling or by casting liquids formed in platinum crucibles.

TABLE III

Properties of REA1 ™ glass materials

| Property | Range of values |
|---|---|
| Major components | $Al_2O_3$, $RE_2O_3$*, 0-35 mole % $SiO_2$ |
| Solubility of rare earth oxides | Up to 50 mole % $RE_2O_3$ |
| Spectral transmission range | Near UV to ~5500 nm |
| Refractive index ($n_D$, $\lambda$ = 589 nm) | 1.7 to >1.8 |
| Abbe number ($n_D$ − 1)/($n_F$−$n_C$) | 40-60 |
| Hardness | 800-1000 Vickers |
| Devitrification temperature | 950-1050° C. |
| Thermal conductivity | 0.01 W/cm · ° C. (at 20° C.) |
| Thermal expansion coefficient | ~10 × $10^{-6}$/° C. |
| Density | 3.4-4.1 gram per $cm^3$ |
| Young's modulus | 110-130 GPa (16 MSI) |
| Chemical stability (in water at 90° C.) | Dissolution rate <1 × $10^{-8}$ $g/cm^2$/min |

*Oxides of elements: Sc, Y, La, Ce, Pr, Nd, Sm, Eu, Gd, Tb, Dy, Ho, Er, Tm, Yb, Lu.

Preferred Embodiment of the Invention

FIG. 1 is a schematic diagram of a solid state laser device that incorporates a doped REA1™ glass and illustrates the preferred embodiment of the invention. Optical radiation 1 that excites the laser medium is provided by a pump light source 2 and directed to the laser gain medium 3. Mirrors 4 are located at opposite ends of the laser gain medium, one of which is partially transmitting to yield the laser output 5. Cooling means 6 may be incorporated to achieve increased laser power output from the device.

The pump light source 2 is preferably a 980 nm laser diode light source but it may be any light source capable of exciting the optically active ions in the gain medium 3. The gain medium 3 is a REA1™ glass of composition within the phase field stated in U.S. Pat. No. 6,482,758, preferably a composition that contains approximately 10 mole % $SiO_2$ that can be melted in a platinum crucible and formed into a glass by conventional casting methods known in the art of glass making. The gain medium 3 is doped with optically active species, preferably rare earth ions such as $Yb^{3+}$, $Er^{3+}$, $Tm^{3+}$, $Ho^{3+}$, or combinations thereof. Any other dopant species capable of producing laser emission from a REA1™ glass, including other optically active rare earth ions may also be used. The partially reflecting output mirror is preferably constructed from REA1™ glass that is not doped with optically active species but it may be of any glass or crystalline material that exhibits high transmission at the wavelength of the laser radiation. Other components of the device are known in the prior art of lasers and optical devices. For example, the surfaces of the gain medium may be coated to reduce reflections.

Example 1

Cast REA1™ Glasses

The cast REA1™ glasses were prepared from mixtures of fine powders of the constituent pure oxides. The oxides were first melted together in a laser hearth. The product of hearth melting was then pulverized, placed in a platinum crucible, and heated in a Deltech DT31FL high temperature furnace to a temperature of 1920 to 1950K to obtain a homogeneous molten oxide. The platinum crucible was then removed from the furnace and the liquid oxide was cast into a mold to produce the glass products. In some cases the mold was heated to allow in-situ stress relaxation of the as-cast glass by slowly cooling the mold. In other cases the glass was cast into a mold at room temperature and could later be annealed at temperatures up to approximately 1100K. Graphite molds were used for the casting operations. Other mold materials that are commonly used in the art of glass making are within the scope of this invention.

The process of hearth melting and pulverization of the hearth-melted product are not essential steps in the glass synthesis. They were used for convenience in the laboratory synthesis work, to (i) homogenize the materials, (ii) minimized the time at temperature required in the platinum crucible melting step, and to (iii) increase the density of the material placed in small platinum crucibles, and (iv) facilitate reaction of the high melting components to ensure complete melting at the process temperature for crucible melting.

Tables I and II list compositions that were cast into glasses and compositions for which the glass was obtained directly from the laser hearth melting operation. In all cases, a glass was obtained. Some crystalline material was often observed at the surface of the glass which, along with any glass whose composition is influenced by the crystallization, could be removed by grinding and polishing operations. Melting in a crucible, such as an iridium crucible, whose melting point exceeds that of pure platinum may be employed to cast glasses such as the REA1™ glasses containing less than approximately 5 mole % $SiO_2$ whose melting point exceeds the melting point of platinum.

It is known in the art that various starting materials may be used to obtain the final compositions of the REA1™ glasses. For example, sol gels may be used to achieve an intimate mixture of the glass components which will yield pure oxide liquid when heated and melted in air or oxygen. Carbonates and/or hydroxides may be used as starting materials, which will decompose to oxides, by the evolution of carbon dioxide or water vapor, respectively, when heated. Also, mixed rare earth oxides may be substituted for the pure oxides used in the present glass syntheses.

Example 2

Glasses for Optical Property Investigations

Several hours are required to complete the procedure of casting a REA1™ glass from a crucible. Small glass samples that are sufficient for optical property investigations can be prepared in a few minutes, by containerless melting techniques. Therefore, many of the compositions of glass that were used to investigate the optical properties of REA1™ glasses as a function of glass composition were prepared by the containerless melting methods.

Example 3

Yb Optical Properties in REA1™ Glass

FIGS. 2-5 illustrate various optical properties of $Yb^{3+}$ ions in REA1™ glass. The ground state absorption spectrum of $Yb^{3+}$ is shown in FIG. 2. The peak absorption cross section is approximately $2 \times 10^{-20}$ $cm^2$, at a wavelength of 980 nm. The absorption peak is quite narrow in a crystalline host material, such as the yttrium aluminum garnet crystals that are used in prior art Yb:YAG lasers. The absorption peak is broadened in a glass material, which facilitates laser pumping by increasing the pump laser waveband that can be used. Thus, Yb:YAG lasers typically use a pump laser operating at approximately 940 nm where a relatively narrow absorption peak occurs, with a much smaller absorption cross section than at the 980 nm peak in REA1™ glasses. The broadened 980 nm absorption peak of $Yb^{3+}$ ions in a REA1™ glass host have the benefits, relative to prior art Yb:YAG lasers, including that (i) more efficient laser pumping is possible, (ii) inexpensive and powerful diode lasers are available for operation at the 980 nm pump wavelength, and (iii) the typical $Yb^{3+}$ laser wavelength is approximately 1030 nm, and use of the 980 nm pump wavelength in Yb:REA1™ glass reduces heating of the gain medium.

The emission spectrum of $Yb^{3+}$ in REA1™ glass is shown in FIG. 3. This spectrum was observed by exciting a sphere of the glass with the focused 980 nm diode laser beam and measuring the $Yb^{3+}$ fluorescence emission at an angle of 90° to the incident pump laser beam. Some of the pump radiation was internally reflected at the glass surface and scattered into the spectrometer, to give the off-scale peak at 980 nm in the emission spectrum. The emission spectrum shows strong emission in the approximately 1030 nm range that is typical of $Yb^{3+}$ lasers.

FIG. 4 illustrates a measurement of the $Yb^{3+}$ fluorescence decay rate. In this experiment, a disk of Yb-doped REA1™ glass, approximately 2 mm thick, was excited by the 980 nm pump laser and the emission decay was measured with an InGaAs detector when the pump laser was turned off. The pump laser path was co-linear with the axis on which fluorescence was measured. A single crystal silicon disk was placed in this path, to absorb the 980 nm pump laser radiation while passing the longer-wavelength tail of the $Yb^{3+}$ fluorescence emission. The silicon filter avoided saturation of the detector with pump light so that recovery from saturation would not limit measurements immediately when pumping was terminated. Pumping was terminated precisely at the point where the constant intensity begins to decrease, at approximately 70 ms as read on the horizontal axis of the plot. This experiment was performed on a glass whose composition, in mole %, was 4 $Yb_2O_3$, 62.5 $Al_2O_3$, and 33.5 $La_2O_3$. It can be seen that decay of the fluorescence signal is precisely exponential, i.e., a plot of the logarithm of intensity versus time is linear, with a slope corresponding to a decay time constant of approximately 0.80 ms.

Figure 5A:
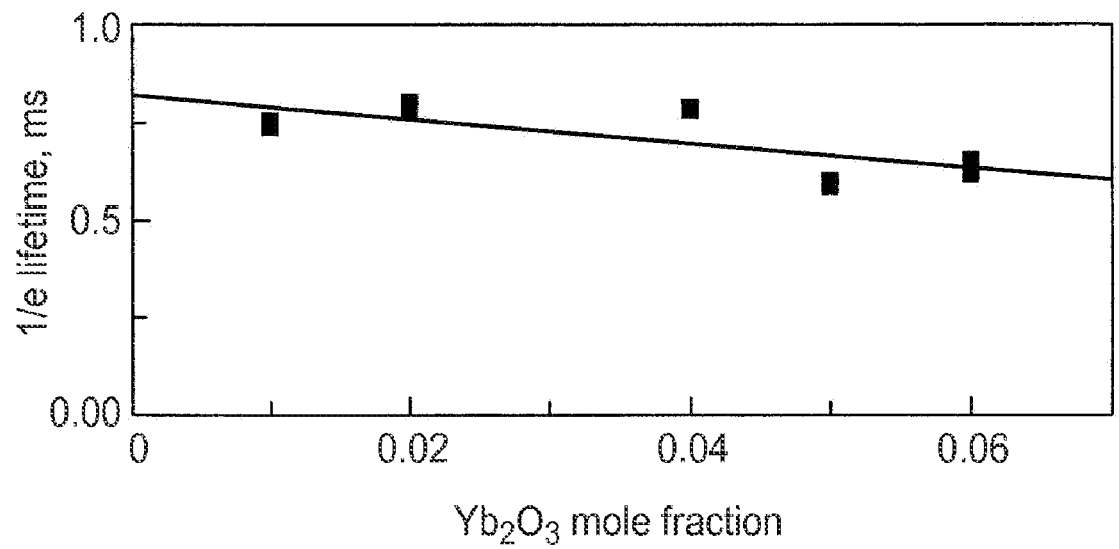
FIG. 5 illustrates change in fluorescence lifetime of $Yb^{3+}$ ions in REA1™ glass with changes in the $Yb^{3+}$ concentration and with the $SiO_2$ content of the glass.
Figure 5B:
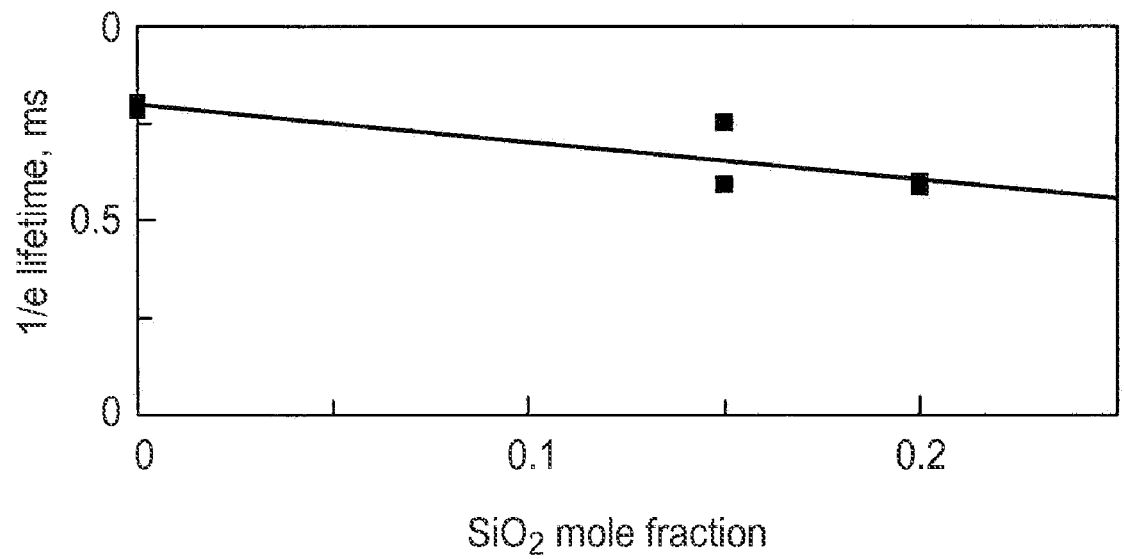

FIG. 5 plots the fluorescence decay times for several Yb concentrations. The top part of this figure shows results for a glass free from $SiO_2$ and the bottom part of the figure shows results for a glasses containing 2 mole % $Yb_2O_3$ and up to 20 mole % of $SiO_2$. It can be seen that the fluorescence decay rates decrease with the $SiO_2$ content of REA1™ glass, and are typical of the 0.5 to 1.0 ms decay time constants observed in other Yb-doped host materials.

Larger lifetimes for the excited state facilitate storage of excited state energy and are generally advantageous to laser design. The results shown in FIG. 5 show that it is advantageous to minimize the $SiO_2$ content of the glass host material, to achieve longer lifetimes for the excited $Yb^{3+}$ ions. The increased lifetime of $Yb^{3+}$ in low-$SiO_2$ REA1™ glasses, relative to high-$SiO_2$ glasses, is a novel and useful property achieved in this invention. The invention provides bulk REA1™ glasses with only ~10 mole % $SiO_2$ that can be melted and cast into bulk glass from platinum crucibles by conventional glass-making methods.

Example 4

Co-Doped Materials

Co-doped REA1™ glass allows novel laser devices to be constructed based on the strong pump laser absorption property of $Yb^{3+}$ ions and the energy transfer processes that occur between the $Yb^{3+}$ ions and co-doped optically active species. The ability of REA1™ glass to maintain favorable optical properties such as large emission lifetimes with large dopant concentrations enables these devices because relatively large dopant concentrations are required to achieve rapid energy transfer between the optically active species. The glasses that comprise this set of materials include all of the single phase glasses lying in the phase field defined in U.S. Pat. No. 6,482, 758. The dopants include, but are not limited to, optically active rare earth elements, such as the trivalent ions of Yb, Er, Tm, Ho, Dy, Nd, and Pr.

The fluorescence decay measurements described in the remainder of this example were, except as noted, performed in the same manner as the $Yb^{3+}$ fluorescence decay measurements described in example 3.

REA1™ Glass Doped with Er and Yb

Figure 6A:
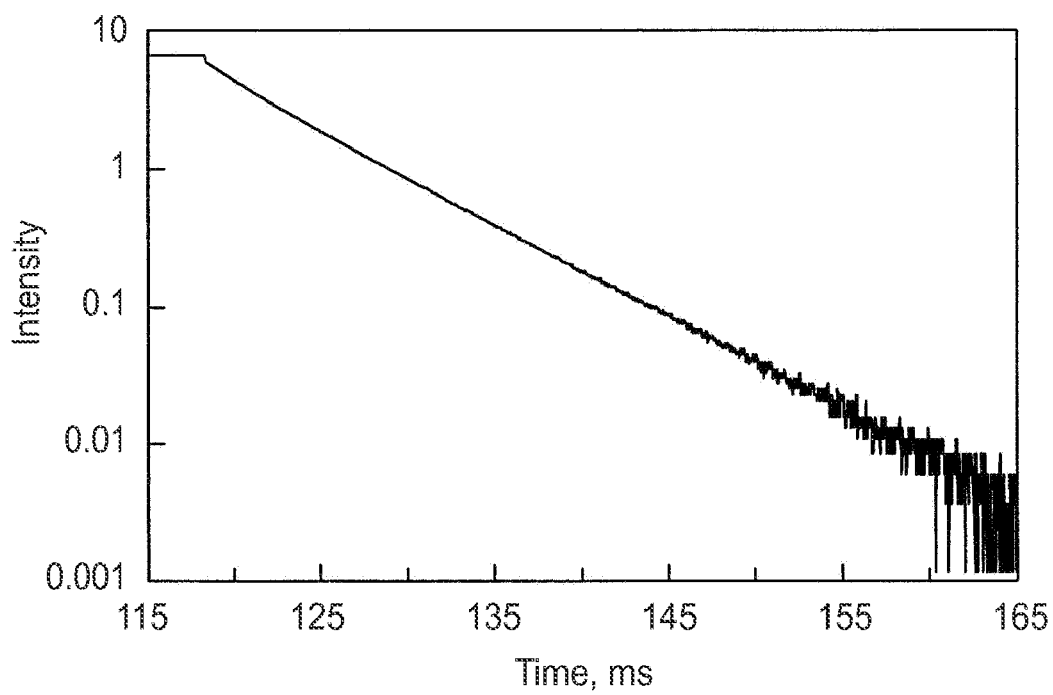
FIG. 6 shows the fluorescence decay curves observed in a REA1™ glass doped with $Er^{3+}$ ions and with another REA1™ glass that was co-doped with $Er^{3+}$ and $Yb^{3+}$ ions.
Figure 6B:
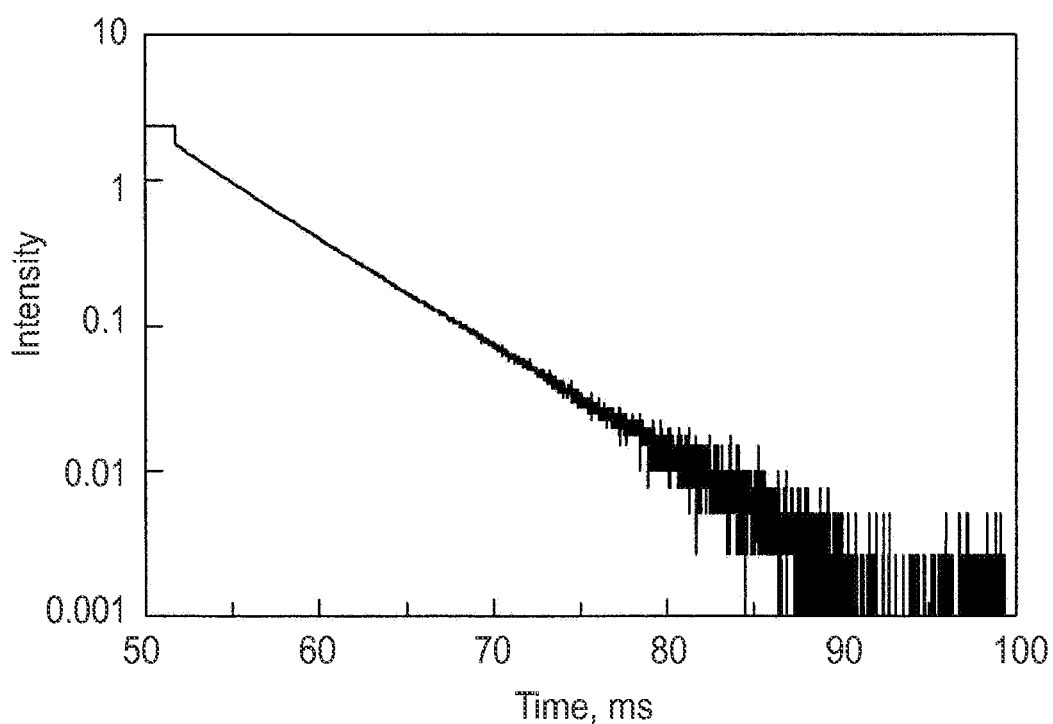

FIG. 6 illustrates the fluorescence decay curves of two REA1™ glass samples doped with $Er^{3+}$ ions and pumped with a 980 nm diode pump laser. Emission from the excited $Er^{3+}$ ions occurs in the well-known waveband of 1500 to 1600 nm that is used in Er-doped optical communications devices. Each of the REA1™ glasses for which data are given is doped with 1 mole % $Er_2O_3$. The figure at the top shows results for a glass that also contains 2 mole % $Yb_2O_3$. The results in FIG. 6 illustrate the following: First, the beginning of the decay curves shows a small and sudden decrease of intensity when the pump laser is turned off, at approximately 118 ms and approximately 52 ms on the horizontal axes of the top and bottom figures, respectively. This sudden decrease of intensity is due to the termination of the pump laser light, a small fraction of which is transmitted to the detector. This decrease is smaller for the Yb-doped sample because this sample transmits a smaller fraction of the incident pump light. Second, the $Er^{3+}$ emission intensity is greater for the Er/Yb co-doped glass than for glass doped only with Er. This result is also due to the increased absorption that occurs in Yb, which increases the level of excitation in the glass. It also demonstrates that transfer of excited state energy from the $Yb^{3+}$ ions to the $Er^{3+}$ ions is efficient; a substantial part of the pump energy absorbed by the $Yb^{3+}$ ions appears as emission from $Er^{3+}$ ions. Third, the large decay lifetimes observed in both sets of data, 5.9 ms for the Er-doped REA1™ glass and 6.6 ms for the co-doped glass shows that the observed emission must be from the Er ions, since emission from Yb ions has a much smaller lifetime of approximately 0.8 ms. The maximum possible $Yb^{3+}$ emission that could be detected from the co-doped sample is much smaller than the observed emission intensity because the silicon filter greatly reduces the $Yb^{3+}$ intensity and has only a small influence on the longer wavelength $Er^{3+}$ intensity. Thus, it is not known if the co-doped glass produced significant direct emission from the excited $Yb^{3+}$ ions.

REA1™ Glass Doped with Er and Tm

Figure 7:
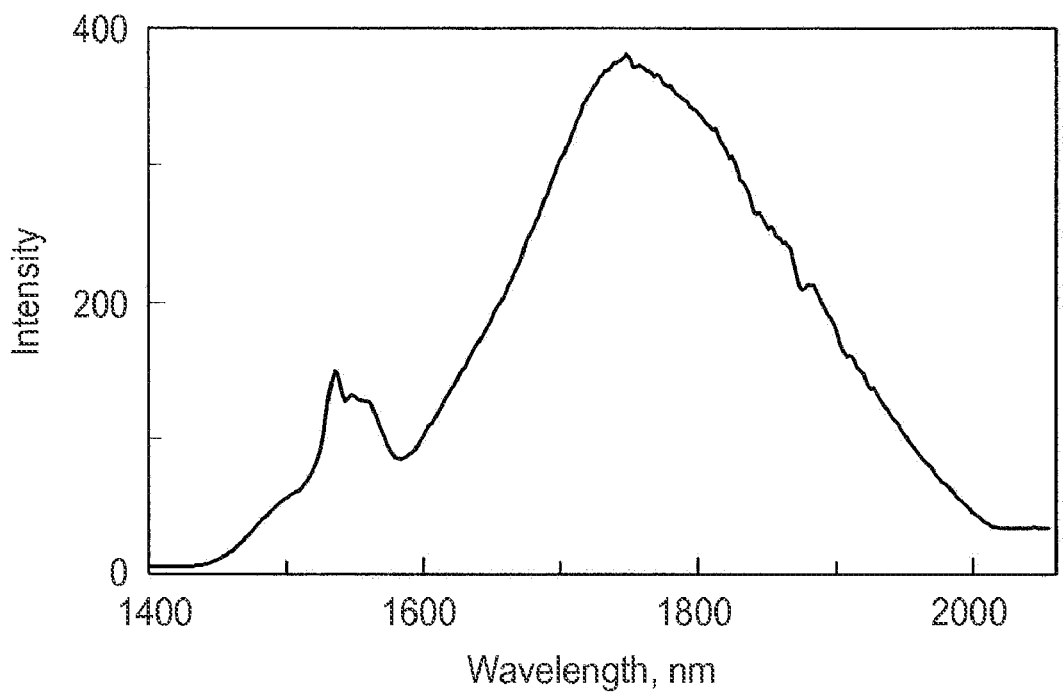
FIG. 7 shows the emission spectrum of a REA1™ glass doped with $Er^{3+}$ and $Tm^{3+}$ ions and excited by a 980 nm diode pump laser.

FIG. 7 illustrates the emission spectrum from REA1™ glass containing 3 mole % $Er_2O_3$ and 1 mole % $Tm_2O_3$, and pumped with a 980 nm diode laser. The spectrum shows relatively weak emission from $Er^{3+}$, in the 1500-1600 nm waveband, and strong emission from $Tm^{3+}$ in the wavelength range from 1450-2000 nm. The spectrum was measured with an extended InGaAs detector with good sensitivity at wavelengths to more than 2050 nm. Since $Tm^{3+}$ does not absorb the pump radiation, the results given show efficient energy transfer from the excited Er ions that are produced by absorption of the pump light to the emitting Tm ions. This result shows that lasers and optical devices can exploit optical gain in REA1™ glass based on emission from $Tm^{3+}$ ions, while using absorption of pump laser radiation at 980 nm, which would not be possible in a glass doped only with Tm. Since excited $Yb^{3+}$ ions transfer energy to $Er^{3+}$ ions in REA1™ glass, it is also possible to build similar devices with REA1™ glass doped with Yb, Er, and Tm. Spectra similar to that shown in FIG. 7 were obtained for REA1™ glass compositions containing zero and 20 mole % of $SiO_2$.

REA1™ Glass Doped with Er and Ho

Figure 8:
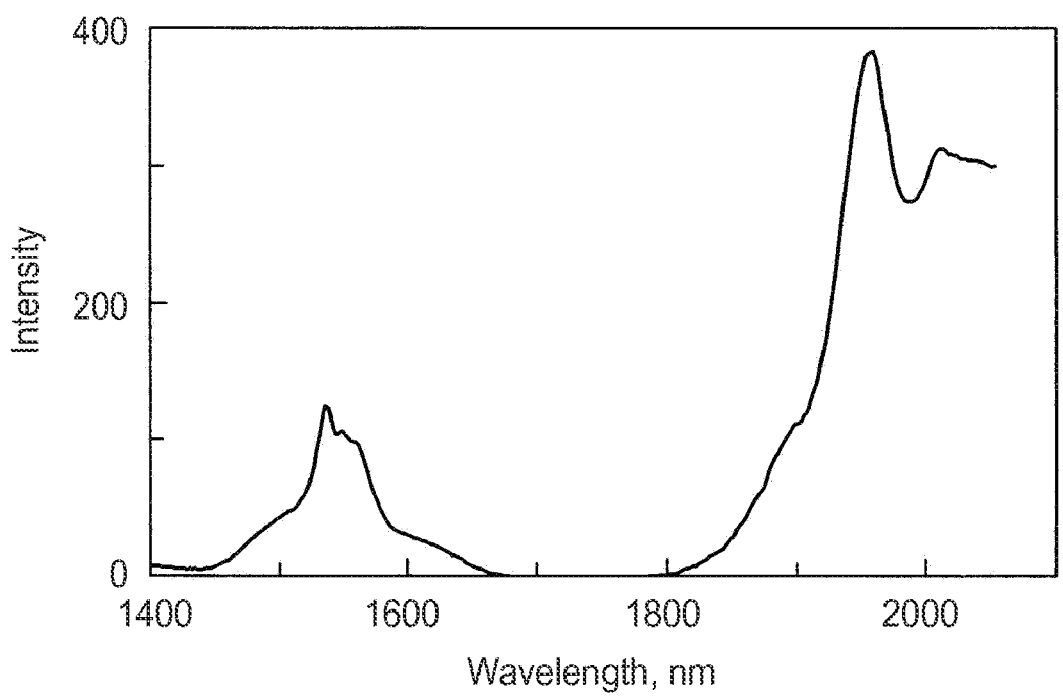
FIG. 8 shows the emission spectrum of a REA1™ glass doped with $Er^{3+}$ and $Ho^{3+}$ ions and excited by a 980 nm diode pump laser.

FIG. 8 illustrates the emission spectrum from REA1™ glass containing 3 mole % $Er_2O_3$ and 1 mole % $Ho_2O_3$, and pumped with a 980 nm diode laser. The spectrum shows relatively weak emission from $Er^{3+}$, in the 1500-1600 nm waveband, and stronger emission from $Ho^{3+}$ in the wavelength range from 1800-2050 nm. The spectrum extends only to approximately 2050 nm, which was the limit for the monochromator used in the experiments. Since $Ho^{3+}$ does not absorb the pump radiation, the results given show efficient energy transfer from the excited Er ions that are produced by absorption of pump light to the emitting Ho ions. This result shows the feasibility of lasers and optical devices that exploit optical gain based on emission from Ho ions, while using absorption of pump laser radiation at 980 nm, which would not be possible in a glass doped only with Ho. Since excited $Yb^{3+}$ ions transfer energy to $Er^{3+}$ ions in REA1™ glass, it is also possible to build similar devices with REA1™ glass doped with Yb, Er, and Ho. Spectra similar to that shown in FIG. 8 were obtained for REA1™ glass compositions containing zero and 20 mole % of $SiO_2$.

Example 5

Er Emission at a Wavelength of ~3000 nm

Figure 9A:
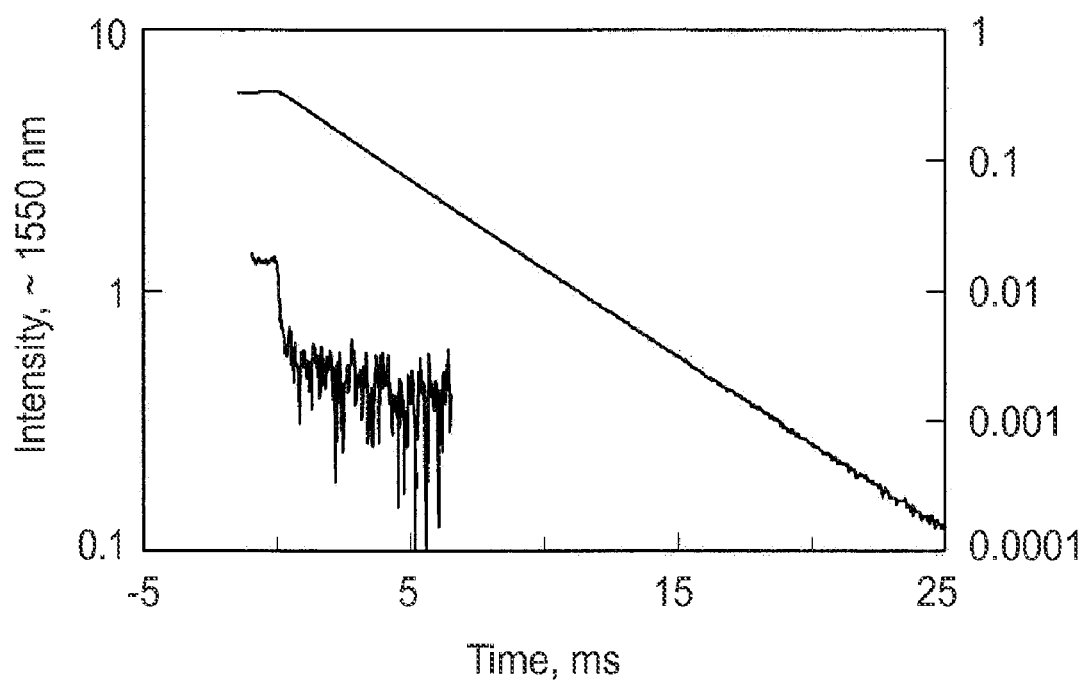
FIG. 9 shows fluorescence decay curves for the emission of infrared radiation at wavelengths of approximately 1550 nm and approximately 3000 nm from Er-doped crystalline YAG and from Er-doped REA1™ glass.
Figure 9B:
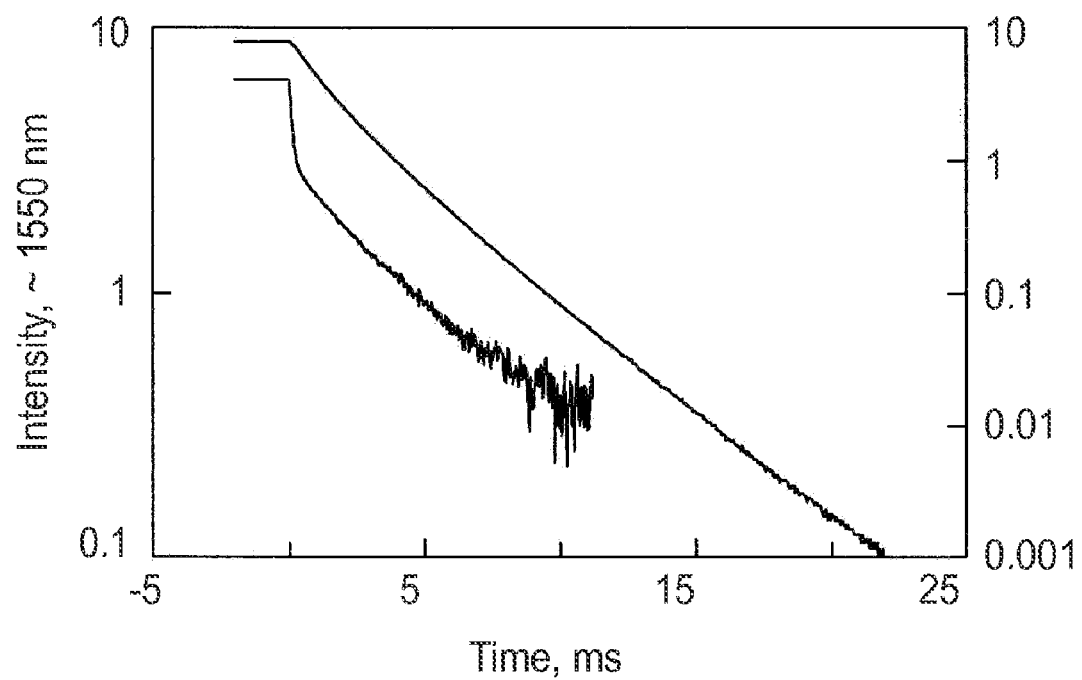

Emission of infrared radiation from Er-doped REA1™ glass can be observed at a wavelength of approximately 3000 nm, in addition to the emission in the 1550 nm waveband. FIG. 9 illustrates the decay of fluorescence intensity for both of these emission wavelengths. The emission at ~3000 nm was measured with a mercury cadmium telluride detector in combination with an interference filter that transmitted light in the wavelength range from 2690-3190 nm. An interference filter was also used to eliminate pump laser transmission to the detector for measurements in the 1550 nm waveband. The results in the top panel of the figure are for a YAG crystal doped with 2 mole % Er. The bottom panel shows results for a REA1™ glass doped with 3 mole % Er. In both cases, the emission at 1550 nm is plotted on the left-hand scale and shows a nearly linear decrease of log(intensity) with time. The emission at ~3000 nm is plotted on the right hand scale. The time bases have been adjusted so that the fluorescence decay curves begin at the same point on the time axes, i.e., at zero ms.

The results given in FIG. 9 show several qualities of the 3000 nm emission from Er-doped materials. First, there is an initial fast decay of the ~3000 nm emission, which occurs from the $4I_{11/2}$ excited state of $Er^{3+}$. This excited state is formed by two processes: direct absorption of the pump laser radiation and cooperative upconversion of the lower, $4I_{13/2}$ $Er^{3+}$ excited state. The initial decay is from radiative loss by emission of the ~3000 nm radiation and by quenching of the $4I_{11/2}$ $Er^{3+}$ ions to form $4I_{13/2}$ $Er^{3+}$ ions. Second, after the initial fast decay, the 3000 nm emission exhibits slower decay. On the scales used in the plot, the curve showing the slower decay of this emission is approximately parallel to that for the emission of ~1550 nm light. The parallel nature of these curves is a consequence of the upconversion process, in which two $4I_{13/2}$ $Er^{3+}$ ions (the ~1550 nm emitter) combine to form one $4I_{11/2}$ $Er^{3+}$ ion (the ~3000 nm emitter) and one ground state $Er^{3+}$ ion. The rate of the cooperative upconversion is approximately proportional to the square of the $4I_{11/2}$ $Er^{3+}$ concentration, i.e., to the square of the ~1550 nm emission intensity. Third, the ~3000 nm emission is 4 to 5 times more intense from the REA1™ glass than from the crystalline YAG material. Part of this difference is due to a 50% greater Er concentration in the REA1™ glass. The remaining difference in the intensities can be attributed to differences in (i) the Er ion absorption cross sections, (ii) the $4I_{13/2}$ upconversion rates, and (iii) the $4I_{13/2}$ radiant emission and quenching rates for the two materials. The results show that the REA1™ glass materials are effective sources of the ~3000 nm radiation by comparison with the prior art Er-doped crystalline YAG material.

Example 6

Glass Properties

Properties of the bulk glass materials were measured using standard techniques. Density was measured by displacement using a 2 ml pycnometer, a microbalance and deionized water as the immersion fluid. Hardness was measured using a microhardness indenter. Glass transition and crystallization temperature ranges were measured by differential scanning calorimetry and differential thermal analysis. The dissolution rate of the glass was investigated by immersing samples in agitated deionized water at 363K (90° C.) and measuring the specific mass change at intervals of 2 days over a period of 16 days. Index of refraction was measured at wavelengths of 486, 589 and 659 nm (F, D and C Fraunhofer lines) using the Becke line method with index-matched oils. Abbe numbers were calculated from the measured refractive indices.

Table III presents properties of the REA1™ glass materials that have been measured on glasses formed either by levitation melting and cooling or by casting liquids melted in platinum crucibles.

Figure 10:
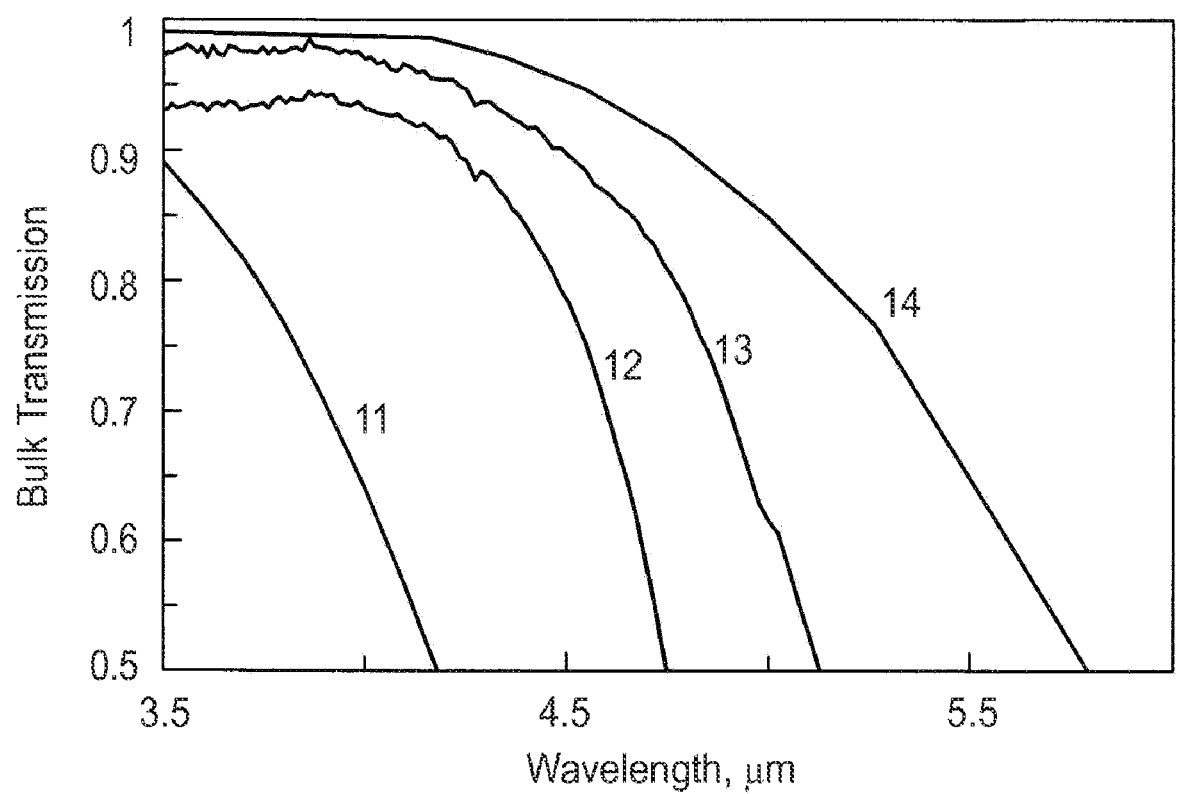
FIG. 10 shows the infrared transmission as a function of wavelength for 2 mm thick samples of REA1™ glasses containing zero to 20 mole % $SiO_2$, pure silica, and single crystal sapphire.

The infrared transmission curves of 2 mm thick samples of two REA1™ glasses containing no optically active dopants are shown in FIG. 10. The figure includes data from the literature for crystalline sapphire and pure silica glass of 2 mm thickness, for comparison purposes. The transmission curves for each material are: 11 silica, 12 REA1™ glass containing 20 mole % $SiO_2$, 13 REA1™ glass containing 5 mole % $SiO_2$, and 14 sapphire. The figure illustrates that good transmission is obtained at wavelengths beyond the infrared cut-off wavelength of silica glass. It is essential to minimize the silica content of glasses to obtain good infrared transmission in windows, lenses, and other optical elements beyond a wavelength of approximately 3 micrometers. This is possible in the family of REA1™ glasses, which contain from zero to 30 mole % of $SiO_2$.

Refractive index values measured for the REA1™ glasses are in the range from 1.80 to 1.90, at the sodium D-line, 589 nm. Measurements at 486 and 656 nm were also obtained to determine the Abbe numbers of the glasses. The Abbe numbers determined for REA1™ glasses are in the range from approximately 32 to approximately 66, depending on the glass composition. These properties are important in optical lenses, since spherical aberration of the lenses is smaller for glasses with larger values of the refractive index, and chromatic aberration of the lenses is smaller for glasses with larger values of the Abbe number. Thus, novel lenses can be fabricated from the REA1™ glasses with reduced chromatic and/or spherical aberration relative to lenses of similar design that are fabricated from prior art materials.

Other modifications and alternative embodiments of the invention are contemplated which do not depart from the scope of the invention as defined by the foregoing teachings and appended claims. For example, the bulk single phase glass material used as the optical gain medium may be synthesized by any suitable method, including but not limited to the methods described herein and in commonly owned U.S. Pat. No. 6,482,758. Also, the gain medium may comprise well known optically active dopants other than the ones described herein. The gain medium may also be pumped by the application of light at wavelengths other than the ones described herein and where at least one of the optically active dopant species absorbs the light. It is intended that the claims cover all such modifications and alternative embodiments that fall within their scope.

We claim:

1. An optical gain medium comprising a bulk single phase glass comprising:
   (a) an optically active dopant that is at least one $Yb^{3+}$, $Er^{3+}$, $Tm^{3+}$, $Ho^{3+}$, $Dy^{3+}$, $Nd^{3+}$, or $Pr^{3+}$, wherein the optically active dopant has a fluorescence lifetime of at least 0.5 ms;
   (b) 10-30 molar % $SiO_2$;
   (c) 27-50 molar % $RE_2O_3$; and
   (d) the balance $Al_2O_3$;
   wherein RE is at least one of Sc, Y, La, Ce, Pr, Nd, Pm, Sm, Eu, Gd, Tb, Dy, Ho, Er, Tm, Yb, or Lu.

2. The optical gain medium of claim 1 wherein a portion of the $RE_2O_3$ is 2 to 20 molar % of at least one of $Yb_2O_3$, $Er_2O_3$, $Tm_2O_3$, or $Ho_2O_3$.

3. The optical gain medium of claim 1 wherein a portion of the $RE_2O_3$ is 2 to 20 molar % $Yb_2O_3$.

4. The optical gain medium of claim 1 wherein the gain medium is optically isotropic.

5. The optical gain medium of claim 1 wherein the gain medium has a ground state absorption coefficient for 980 nm light of at least $1 \times 10^{-20}$ $cm^2$.

6. The optical gain medium of claim 1 wherein the gain medium emits infrared light at a wavelength of 1020 nm to 1040 nm when pumped with radiation at a wavelength of 970 nm to 990 nm.

7. The optical gain medium of claim 6 having a peak absorption wavelength and a peak emission wavelength, wherein the difference between the wavelength of the absorption peak and the wavelength of the emission peak is no greater than 60 nm.

8. The optical gain medium of claim 1 wherein the composition is castable and the gain medium has a shape of a rod or a plate.

9. An optical gain medium consisting essentially of a bulk single phase glass comprising (a) an optically active dopant that is at least one $Yb^{3+}$, $Er^{3+}$, $Tm^{3+}$, $Ho^{3+}$, $Dy^{3+}$, $Nd^{3+}$, or $Pr^{3+}$, wherein the optically active dopant has a fluorescence lifetime of at least 0.5 ms and (b) least one rare earth oxide, aluminum oxide and silicon dioxide having a composition substantially within a heptagonal region of a ternary composition diagram of the rare earth oxide-alumina-silica system defined by points having the molar percent compositions as follows: 1% $RE_2O_3$, 59% $Al_2O_3$, and 40% $SiO_2$; 1% $RE_2O_3$, 71% $Al_2O_3$ and 28% $SiO_2$; 14.5% $RE_2O_2$, 75.5% $Al_2O_3$, and 10% $SiO_2$; 50% $RE_2O_3$, 40% $Al_2O_3$, and 10% $SiO_2$; 50% $RE_2O_3$ and 50% $SiO_2$; 33.33% $RE_2O_3$, 33.33% $Al_2O_3$ and 33.33% $SiO_2$; and 16.67% $RE_2O_3$, 50% $Al_2O_3$ and 33.33% $SiO_2$, where RE is at least one of Sc, Y, La, Ce, Pr, Nd, Pm, Sm, Eu, Gd, Tb, Dy, Ho, Er, Tm, Yb or Lu.

10. The optical gain medium of claim 9 wherein a portion of the $RE_2O_2$ is 2 to 20 molar % $Yb_2O_3$.

11. The optical gain medium of claim 9 wherein the gain medium has a shape of a rod or a plate.

* * * * *

UNITED STATES PATENT AND TRADEMARK OFFICE
CERTIFICATE OF CORRECTION

PATENT NO. : 7,951,735 B2
APPLICATION NO. : 12/100073
DATED : May 31, 2011
INVENTOR(S) : J. K. Richard Weber et al.

Page 1 of 1

It is certified that error appears in the above-identified patent and that said Letters Patent is hereby corrected as shown below:

On the Title Pg Item (56) (Other Publications) 2nd Col.
Line 7, delete "Diode-Purfiped" and insert -- Diode-Pumped --, therefor.

Column 7
Line 5, delete "Yb" and insert -- $Yb^{3+}$ --, therefor.
Line 40, delete "REA1 ™" and insert -- REA1™ --, therefor.

Column 12
Line 22, delete "$4I_{11/12}$" and insert -- $^4I_{11/12}$ --, therefor.
Line 24, delete "$4I_{13/2}$" and insert -- $^4I_{13/2}$ --, therefor.
Line 27, delete "$4I_{11/2}$" and insert -- $^4I_{11/2}$ --, therefor.
Line 27, delete "$4I_{13/2}$" and insert -- $^4I_{13/2}$ --, therefor.
Line 33, delete "$4I_{13/2}$" and insert -- $^4I_{13/2}$ --, therefor.
Line 34, delete "$4I_{11/2}$" and insert -- $^4I_{11/2}$ --, therefor.
Line 36, delete "$4I_{11/2}$" and insert -- $^4I_{11/2}$ --, therefor.
Line 43, delete "$4I_{13/2}$" and insert -- $^4I_{13/2}$ --, therefor.
Line 44, delete "$4I_{13/2}$" and insert -- $^4I_{13/2}$ --, therefor.

Column 14 Line
42, in Claim 9, delete "$RE_2O_2$," and insert -- $RE_2O_3$, --, therefor. Line 49,
in Claim 10, delete "$RE_2O_2$" and insert -- $RE_2O_3$ --, therefor.

Signed and Sealed this
Ninth Day of August, 2011

David J. Kappos
*Director of the United States Patent and Trademark Office*